(12) United States Patent
Lacarbonara et al.

(10) Patent No.: US 10,407,939 B2
(45) Date of Patent: Sep. 10, 2019

(54) TENSAIRITY STRUCTURE WITH SHAPE-MEMORY WIRE ROPES

(71) Applicant: Universita' Degli Studi di Roma "La Sapienza", Rome (IT)

(72) Inventors: Walter Lacarbonara, Rome (IT); Biagio Carboni, Rome (IT)

(73) Assignee: Universita' Degli Studi di Roma "La Sapienza", Rome (IT)

( * ) Notice: Subject to any disclaimer, the term of this patent is extended or adjusted under 35 U.S.C. 154(b) by 0 days.

(21) Appl. No.: 15/756,585

(22) PCT Filed: Sep. 16, 2016

(86) PCT No.: PCT/IT2016/000213
§ 371 (c)(1),
(2) Date: Mar. 1, 2018

(87) PCT Pub. No.: WO2017/051440
PCT Pub. Date: Mar. 30, 2017

(65) Prior Publication Data
US 2018/0179779 A1    Jun. 28, 2018

(30) Foreign Application Priority Data
Sep. 25, 2015 (IT) .................... 102015000055410

(51) Int. Cl.
*E04H 15/20* (2006.01)
*D07B 5/00* (2006.01)
(Continued)

(52) U.S. Cl.
CPC .............. *E04H 15/20* (2013.01); *D07B 1/08* (2013.01); *D07B 1/147* (2013.01); *D07B 5/00* (2013.01);
(Continued)

(58) Field of Classification Search
CPC ..... E04H 15/20; E04H 2015/201; D07B 1/08; D07B 1/147; D07B 5/00; D07B 2401/206;
(Continued)

(56) References Cited

U.S. PATENT DOCUMENTS 5,421,128 A     6/1995  Sharpless et al.
5,735,083 A *   4/1998  Brown ................. E04C 3/005
                                                       52/2.13
(Continued)

FOREIGN PATENT DOCUMENTS

WO     WO 2004/083570    9/2004
WO     WO 2004/094754    11/2004
WO     WO 2017/051440    3/2017

OTHER PUBLICATIONS

International Search Report and the Written Opinion dated Jan. 2, 2018 From the International Searching Authority Re. Application No. PCT/IT2016/000213. (12 Pages).
(Continued)

*Primary Examiner* — Patrick J Maestri (57) ABSTRACT

The present invention relates to a structural element known in the technical field as "tensairity", which introduces as distinctive elements with respect to the known art: (i) ropes in the shape-memory alloy (SMA) with superelastic (SE) and shape memory (ME) behavior; (ii) mechanical tensioners for the adjustment of the initial tension in the ropes; (iii) optionally a control apparatus (processor) is connected to electric circuits that induce flow of intensity variable current through the SMA wire ropes; (iv) optionally devices for real-time monitoring of the temperature and the level of tension in the SMA ropes; (v) optionally devices for real-time monitoring of the tensairity oscillations; (vi) optionally
(Continued)

new structural geometries capable of sustaining static actions and multidirectional dynamics.

13 Claims, 8 Drawing Sheets (51) Int. Cl.
*F03G 7/06* (2006.01)
*E04C 3/00* (2006.01)
*E04C 3/46* (2006.01)
*D07B 1/08* (2006.01)
*D07B 1/14* (2006.01)

(52) U.S. Cl.
CPC ............... *E04C 3/005* (2013.01); *E04C 3/46* (2013.01); *F03G 7/065* (2013.01); *D07B 2205/3085* (2013.01); *D07B 2401/206* (2013.01); *E04H 2015/201* (2013.01)

(58) Field of Classification Search
CPC ... D07B 2205/3085; F03G 7/065; E04C 3/46; E04C 3/005
See application file for complete search history.

(56) References Cited

U.S. PATENT DOCUMENTS

| | | | | |
|---|---|---|---|---|
| 6,237,663 | B1 * | 5/2001 | Cipparrone | D07B 1/062 |
| | | | | 148/402 |
| 7,014,922 | B2 * | 3/2006 | Riva | B60C 9/0007 |
| | | | | 152/427 |
| 8,640,386 | B1 * | 2/2014 | Griffith | E04C 3/005 |
| | | | | 52/2.11 |
| 2011/0209416 | A1 | 9/2011 | Pedretti | |
| 2015/0040753 | A1 * | 2/2015 | Bishop-Moser | F15B 15/10 |
| | | | | 92/254 |
| 2016/0016355 | A1 * | 1/2016 | Marcoe | B29C 61/0625 |
| | | | | 174/255 |

OTHER PUBLICATIONS

Rapporto di Ricerca e Opinione Scritta [Search Report and the Written Opinion] dated May 25, 2016 From the Ministero della Sviluppo Economico, Direzione Generale Sviluppo Produttivo e Competitivita, Ufficio Italiano Brevetti e Marchi Re. Application No. IT UB20153899. (8 Pages).

* cited by examiner

TENSAIRITY STRUCTURE WITH SHAPE-MEMORY WIRE ROPES

RELATED APPLICATIONS

This application is a National Phase of PCT Patent Application No. PCT/IT2016/000213 having International filing date of Sep. 16, 2016, which claims the benefit of priority of Italian Patent Application No. 102015000055410 filed on Sep. 25, 2015. The contents of the above applications are all incorporated by reference as if fully set forth herein in their entirety.

FIELD AND BACKGROUND OF THE INVENTION

The present invention relates to a tensairity structure with shape memory ropes.

More precisely, the present invention relates to a structural element known in the technical field as "tensairity" that introduces distinctive elements with respect to the prior art: (i) ropes in the shape-memory alloy (SMA) with superelastic (SE) and shape memory (ME) behaviours; (ii) mechanical tensioners for adjustment of the initial tension in the ropes; (iii) optionally a control apparatus (processor) is connected to electric circuits that induces variable intensity current passes through the SMA wire ropes; (iv) optionally devices for real-time monitoring of the temperature and the level of tension in the SMA ropes; (v) optionally devices for real-time monitoring of the tensairity oscillations; (vi) optionally new structural geometries capable of sustaining multidirectional static and dynamic actions.

The term "tensairity" is a registered trademark of Airlight Ltd Via Croce 1, 6710 Biasca, Switzerland presented as a new structural concept by RH Luchsinger, A. Pedretti, M. Pedretti, P. Steingruber [1,2]. The precursors and subsequent patents to this invention are numerous. In the following, patent applications are briefly listed and described, which have a relationship with the invention proposed here.

In chronological order, the first patent which couples inflatable elements connected to rigid elements to form a structure similar to a beam is U.S. Pat. No. 2,936,056 A of 1957 [3], in which the variable-length inflatable slides are described for evacuating the passengers of an aircraft. This patent has had great resonance considering the number of patents related to it presented later and the longevity of the proposed application, still used today.

In the patent U.S. Pat. No. 5,311,706 A of 1991 [4] an inflatable reticular structure is given, which may take various forms. It is constituted by a rigid skeleton delimited by sheets of Mylar forming an inflatable envelope or inflatable cylinders interconnected by rigid elements. This application has been proposed for connection of satellites or ships. The same author proposed a new patent [5] connected to the preceding, wherein the rigid skeleton of the inflatable structure is made by reinforced fiber bundles that realize cylindrical shape elements of cable type. These beams, initially flexible, contain inside thermoplastic material filaments. Once the inflatable structure has assumed the desired shape, the filaments are melted by heat sources and the various beams stiffen and form the skeleton of the inflatable structure.

In 2001 patent U.S. Pat. No. 6,463,699 B1 [6] entitled "Air beam construction using differential pressure chambers" has been filed. The application consists in an inflatable diaphragm of cylindrical shape inside which a beam is fixed which have "I"-shaped section and consists of flexible material impermeable to air. The beam with the "I"-shaped section divides the cylindrical diaphragm in four inner air chambers tubes and contains within it the compressible material (referred to as "micro bead particles or similar material"). By introducing air pressure into the four inner air chambers, the material contained in the beam is compressed and the entire structure becomes rigid.

The patent, wherein for the first time the structural concept of tensairity is claimed, is US 20060260209 [7] filed in 2004. An inflatable structure (flexible membrane) is proposed, which is made integral with a rigid element of high slenderness and able to withstand a state of compression. Around the cylindrical diaphragm, at least two tensioned elements are twisted in opposite directions, which are connected to compressed elements. The basic idea is to inflate the pneumatic element in a manner such that the elements helically wound are subject to a state of tension and the rigid element is in compression. The compressed element is also stabilized by the pneumatic element which avoids the achievement of the instability load.

US patent 20080295417 [8] of 2008 presents an assembly of at least three inflatable cylinders made integral with each other. One of the three inflatable cylinders has a length equal to about half of the other. Overall, the cylinders in pressure form an arc to be used as skeleton structures such as domes.

In 2011, Mauro Pedretti (inventor of tensairity) proposed a structural node [9] for anchoring one or more tensairity. Such a node is able to provide compression and traction to the structural components of the tensairity using non-described screws and the cables anchors are.

In WO2004/094754, a pneumatic structural element comprising a hollow body, at least two elements in traction, two caps, at least two nodes, at least one compression rod are described. The length of the traction elements of said pneumatic structural element can be varied by Δl pneumatically, hydraulically, or mechanically. An actuator or a control unit is mounted between the ends of the traction elements and a node. The tensile stress in the traction elements can be adapted to the circumstances by means of electronic control and adjustment devices. The pressure in the pneumatic elements is varied through the passage of current in the fluid contained in the same.

The traction elements in WO2004/094754 are made of steel, aluminum, or plastic material (see p.3 1.8-14). These materials do not present any of the typical properties of the shape memory materials, including the super-elastic effect and the ability to recover a pre-impressed form.

The most recent patent relating to tensairity is the U.S. Pat. No. 8,640,386 B1 [10] filed in 2012. In this patent, simply inserting in the classical tensairity (which is subject to low inflation pressure) one or more inflatable cells is proposed, that can in turn be inflated at high pressure. The basic idea is to increase the flexural stiffness of the entire structure with the above-mentioned high-pressure internal air chambers.

SUMMARY OF THE INVENTION

Figure 1:
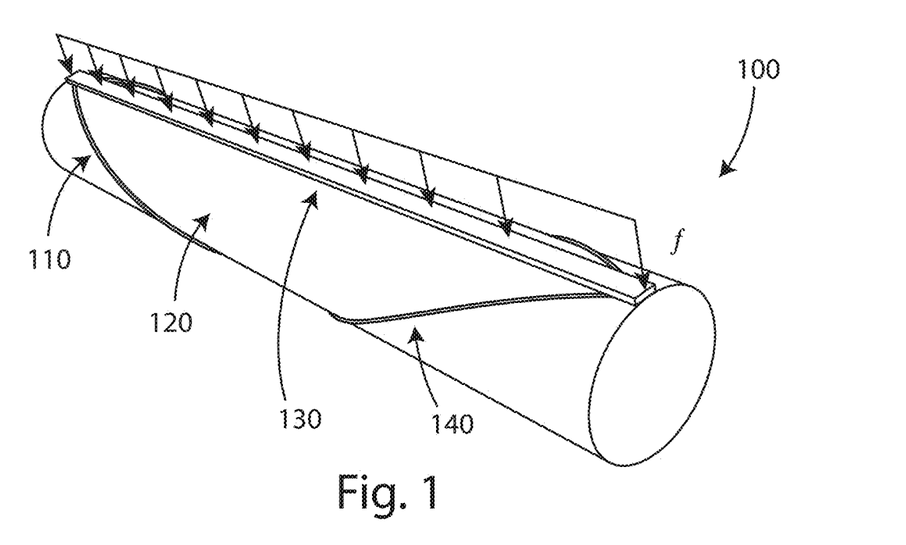
FIG. 1 shows an example of the basic elements constituting a tensairity, according to the known art.

Referring to FIG. 1, the constitutive basic elements of a tensairity are represented by a beam 130 of high slenderness, an inflatable structure 120 in the cylindrical form made of a cylindrically shaped membrane, a set of ropes 110, 140.

The beam 130 is made integral with a cylinder director curve while a pair of cables 110, 140 anchored at the beam ends are wrapped around the inflatable cylinder 120. The cylinder is inflated by determining a state of traction in the cables and compression in the high-slenderness beam. The tensairity may support transverse loads f agents in the direction indicated in FIG. 1. They generate a tension rise in the cables and compression in the slender beam 130. The mechanical principle of operation of a tensairity consists in the distribution of tensile and compression traction, respectively, between the ropes and the slender beam. The pneumatic element 120 carries out this function and at the same time exerts an action of contrast on high slenderness beam avoiding its warpage for the high compression action. Loads with direction and orientation different from those shown in FIG. 1 cannot be applied to tensairity as it does not allow to develop the compression-traction bearing mechanism.

The main feature of tensairity consists in the ability to sustain a given transverse load given a structural weight that is about 10 times lower compared to a conventional steel beam. This tremendous ability comes from rational distribution of compression and traction, and in that the membrane (pneumatic element) applies to the compressed beam a stabilizing action which prevents it from losing stability for peak load.

The tensairity can be used for the realization of large light covers, temporary bridges or other large structures for emergency admissions. These structures have in common the fact of being subject to predominantly static actions in operating conditions.

Because of their low structural damping, the tensairity are not suitable for applications in which there are dynamic forcings. Examples of such applications include aerospace structures which may include airships, stratospheric platforms or, more generally, space habitats. The invention aims to overcome the above inherent limitation of the prior art. Moreover, further object of the invention is to provide novel technical means so that the tensairity become an active structure able to change its own mechanical characteristics in real time on the basis of operating requirements.

It is subject-matter of the present invention a structure according to the annexed claims, which form an integral part of the present description.

The inventive elements introduced make tensairity a technological product with high performance which is required for certain applications in the industrial and civil sectors.

BRIEF DESCRIPTION OF THE SEVERAL VIEWS OF THE DRAWINGS

The invention will be now described, for illustrative but not limitative purposes, with particular reference to the figures of the accompanying drawings, in which:

FIG. 3 shows in (a) a three-dimensional view, and (b) a plan view of the toroidal tensairity, according to the present invention;

DESCRIPTION OF SPECIFIC EMBODIMENTS OF THE INVENTION

Figure 2:
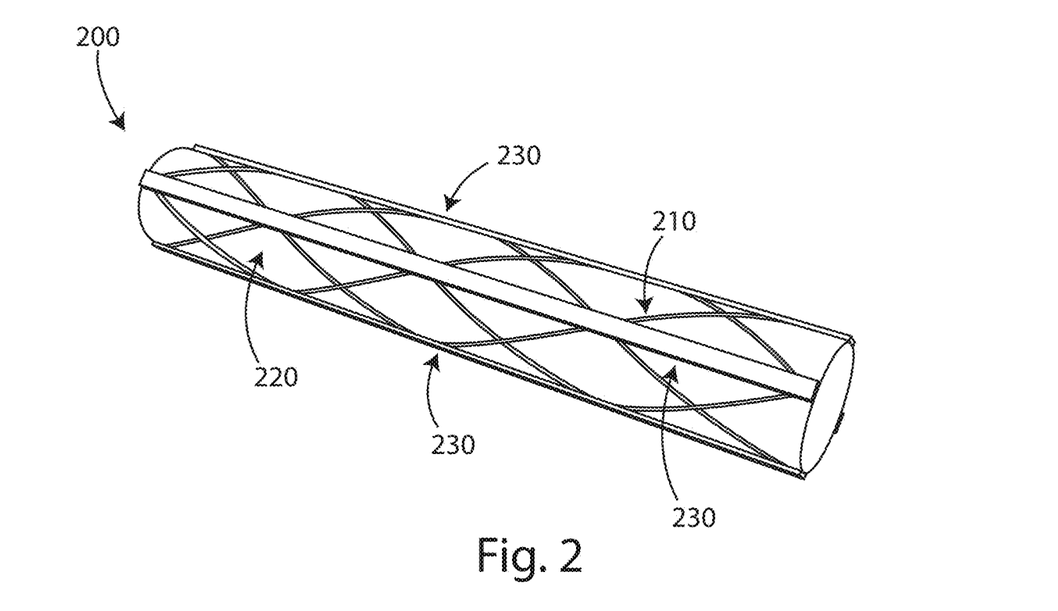
FIG. 2 shows a tensairity for multi-directional action, according to the present invention.

Referring to FIG. 2, the tensairity according to the invention has at least four high-slenderness rods 230 solidarized along four lines of the pneumatic element 220. Around the latter, at least four pairs of SMA cables and/or mixed steel-SMA and/or other material-SMA 210 are wound. Each pair of cables has at least one winding around the pneumatic casing and is anchored to the ends of the associated rod. Such realization scheme makes tensairity able to support actions in the two orthogonal directions and in both directions for each one.

The configuration of FIG. 2 is not restrictive of the geometries that can be generalized using a greater number of beams with various sections and a greater number of ropes. In the simplest non-limiting case, the ropes are connected to the rods through specific anchors similar to terminals, for example friction aluminium terminals.

Figure 3:
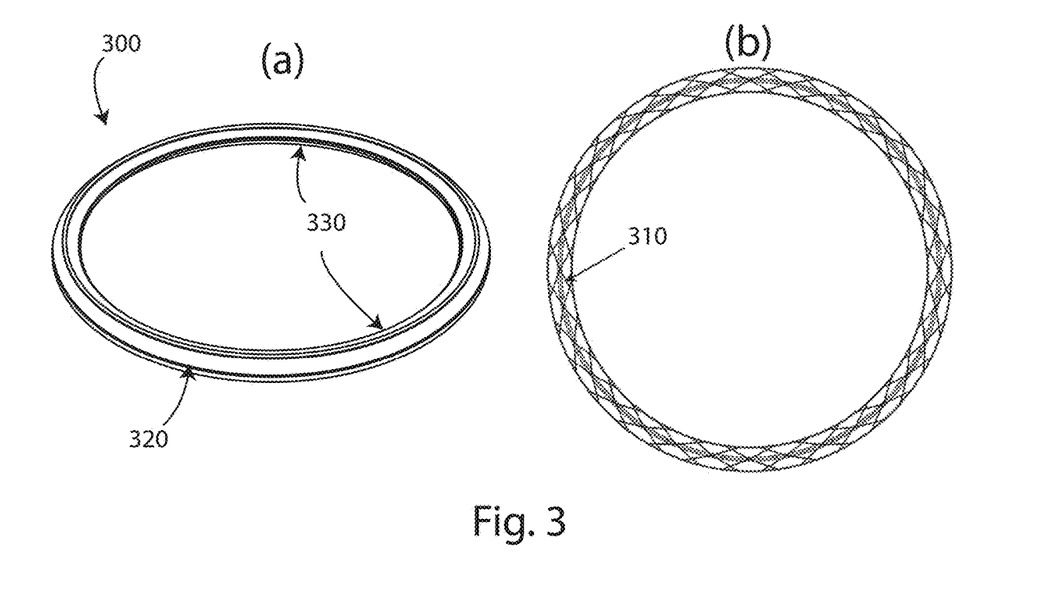

In FIG. 3, a different type of toroidal geometry 300 of a tensairity is shown, which is designed in particular for an aerostatic capacity structure (for example, stratospheric platforms). The rods 330 run along the parallels of the toroidal pneumatic element 320 (see Figure (a)) and the SMA ropes 310 are wrapped around it (see FIG. 3 (b)) and connected to the rods.

Structural Damping Increase

An element of the present invention that allows to extend the application field of tensairity consists of replacing the ropes, usually made of steel, with SMA ropes (superelastic and shape-memory behaviour) or mixed steel-SMA or mixed other material-SMA wherein by "other material" another metal alloy or polymer materials are intended.

The presence of the SE shape-memory material greatly increases the damping of the tensairity thanks to the austenite-martensite transformation generated by the traction cycles in the ropes, without showing residual inelastic deformations. The level of dynamic damping confers stability to the structure. Furthermore, it can be widely adjusted by acting on the number and section of the shape-memory wire ropes. The amplitude of the displacement to which such damping is achieved can be varied with the initial level of tension in the ropes. In the connection zone between the ropes and the slender beams, mechanical elements are placed for a pretensioning additional to that already obtained with the pneumatic inflation element. The elements for pretensioning hose inside them the load cells capable of measuring the level of pretensioning applied.

Figure 4:
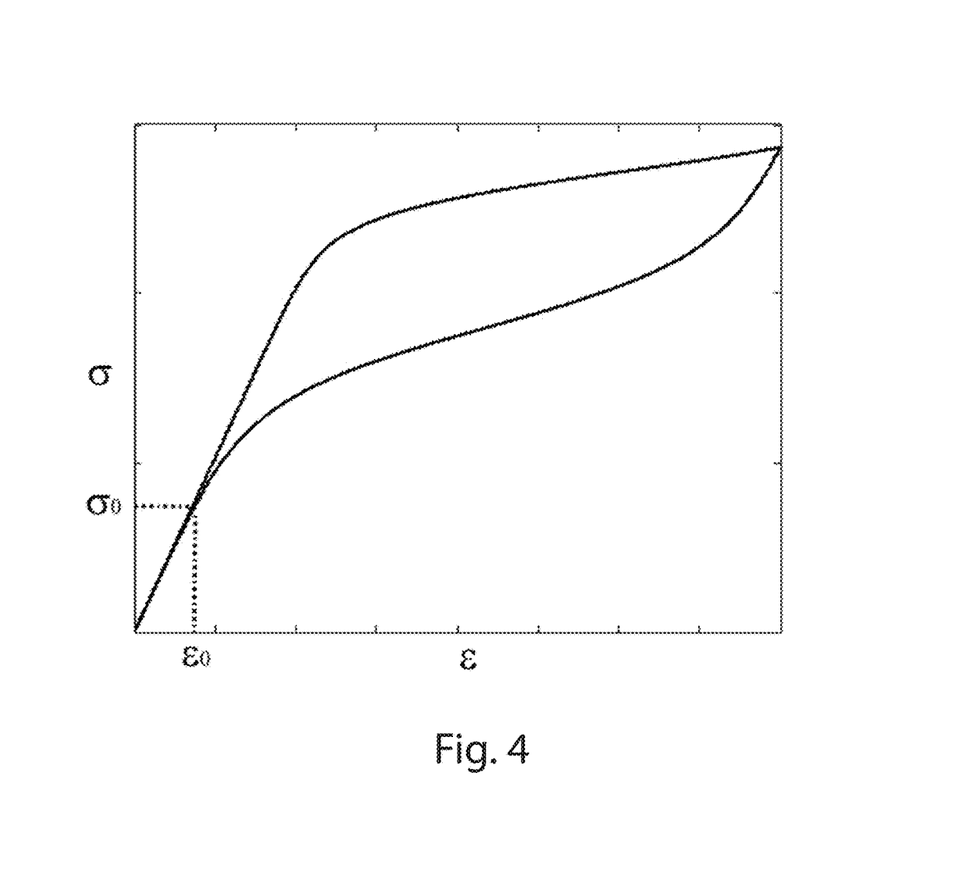
FIG. 4 shows a stress-strain cycle of a SMA wire rope SE behavior, according to the present invention.

In FIG. 4 there is shown a stress-strain cycle on which is indicated the pretensioning level $\sigma_0$ which allows the SMA material to dissipate energy due to deformation cycles induced by the actions on tensairity. The numerical value of such pre-tension is extremely variable from alloy to alloy and varies considerably even for a same alloy with different compositions and for different undergone machining processes. In any case, the $\sigma_0$-$\varepsilon_0$ point to which reference is made in FIG. 4 can be defined as the transition point (transition deformation) by the elastic behavior of the post-elastic behavior. This threshold is also that beyond which it can be assumed that the austenite-martensite transformation begins.

A prototype of tensairity with SE behaviour SMA material has been made with an aluminium rod, an inflatable cylinder PVC and two wires made of shape memory material (Nitinol). The aluminum rod is constrained at the ends to two supports with a hinge and a carriage in order to be a leaned beam scheme. The wires of Nitinol shape-memory material are pre-tensioned through the inflation of the PVC cylinder and with screw turnbuckles. In general, there will be tensioning means which comprise or are constituted by mechanical tensioners for adjusting the initial tension of four or more pairs of ropes 210, 310, placed in the connection zones between the ropes and the rods. The initial tensions include tensions in the linear regime of SMA wires and tensions in non-linear regime of the SMA wires.

Figure 5:
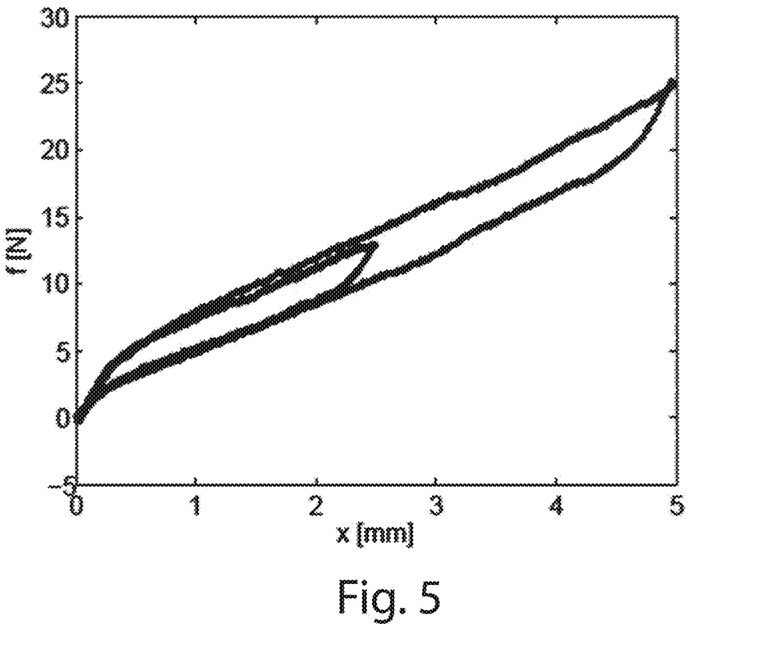
FIG. 5 shows the force-displacement cycles of shape memory tensairity, according to the present invention.

The (initial or operation) tensioning can also be obtained through the variation of the length of the SMA wire ropes, using a source of electrical current connected to said four or more pairs of ropes, in such a way that the electric current can induce a temperature variation in at least one of said four or more pairs of ropes. In this way, contrary to the known art, the tensioning of tensairity is obtained by the only SMA wire ropes, without having to introduce mechanical tensioners. The tensairity is subjected to cycles of transverse displacement in the center line by measuring the opposing force with a load cell. In FIG. 5, the force-displacement curves are shown, which are obtained for two displacement amplitudes. The dissipated energy is represented by the area internal to the loop and is due to the phase transition of the shape memory material. Upon removal of the load, the structure shows no residual deformations due to the "super-elasticity" of the consisting Nitinol wires. The curves correspond to an equivalent viscous damping of about 4% (curve with width of 2.5 mm) and 3% (curve with width of 5 mm). Unlike the tensairity according to the invention, the tensairity realized according to the known art shows negligible dampings (less than 1%) for the purpose of a rapid dynamic stabilization of the structure.

Active Control of Tensairity

Figure 6:
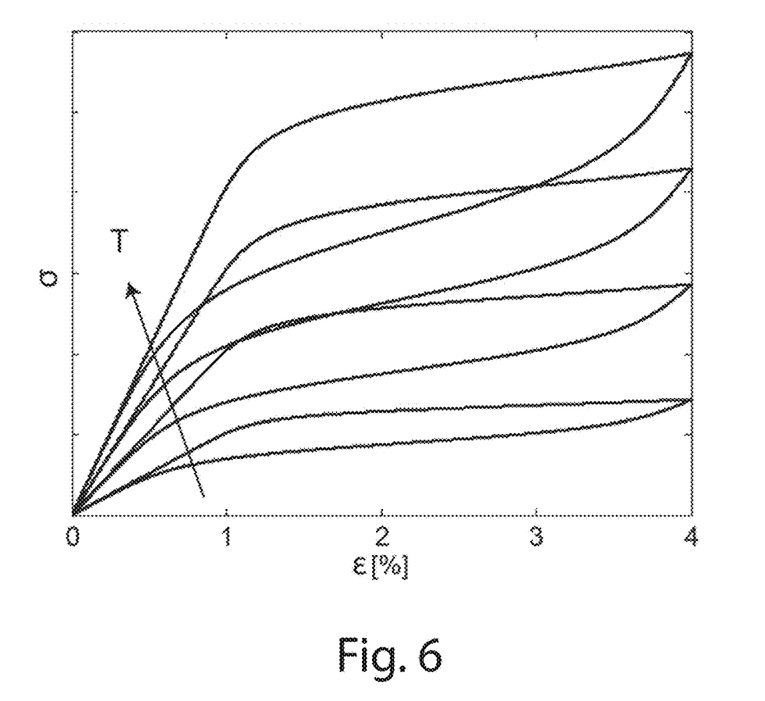
FIG. 6 shows stress-strain cycles of a SE-behaviour SMA wire rope with increasing temperature, according to the experiments given in the literature.

A further new innovative aspect here proposed is in the fact that the tangent stiffness of the SE-behaviour SMA ropes can also be increased twice by varying the temperature of the rope (by the Joule effect) making the electric current flow. In FIG. 6, the stress-strain cycles to vary the temperature of the material are shown. The tangent modulus of elasticity at the origin of the Nitinol is doubled for a temperature increase of about 50° C. from the ambient temperature of 20° C. [11-12].

Figure 7:
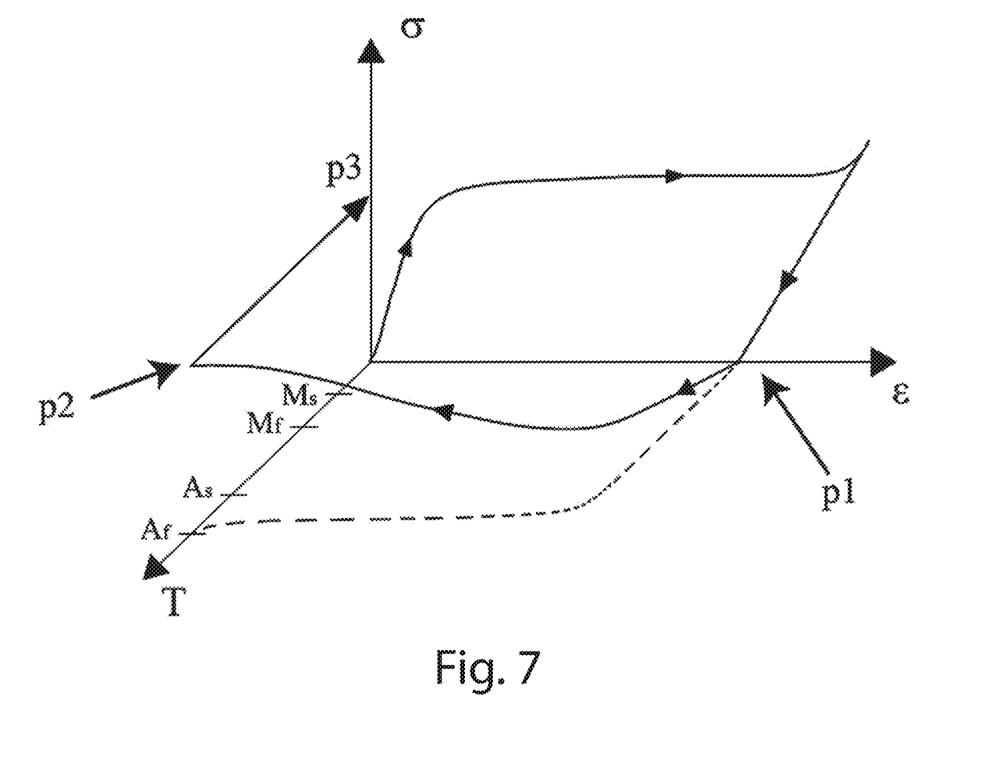
FIG. 7 shows the effect of memory to a route of a SMA wire rope ME behavior, according to the experimental behavior reported in the literature.

The ropes in ME behavior may be used as active elements able to vary their action on the tensairity during operation. These cables can be shortened (up to 8% of the value of the length if the Nitinol or NiTiCu is used as a SMA alloy) varying its length through the Joule heating. One wants to take advantage of the so-called one-way effect of the shape memory material for applying in real time an additional state of tension in the tensairity in cases where this is necessary (e.g., loss of pretension as a result of the visco-elastic relaxation or to exercise active control over tensairity). The one-way memory effect is illustrated in FIG. 7 [11-12]. The rope is put into operation in the tensairity in its elongated configuration indicated by p1. Subsequently, it is heated by the Joule effect beyond the Af (Austenite finish) temperature, generating the recovery of the deformation imposed initially. The rope being anchored to the tensairity structure, on the latter a tension indicated by the point p2 is applied that also preserves itself when the rope temperature returns to room temperature in p3. The proposed tensairity, compared to existing technology, has the possibility to vary in real time both the tangent and the geometric stiffness by a control apparatus that regulates the temperature in the SMA ropes (selectively with respect to the single wire rope according to the needs assessed by a logic control unit referenced as CPU in FIG. 8) according to the operating conditions. It is also possible to ensure an adequate level of structural damping against multidirectional dynamic actions.

Figure 8:
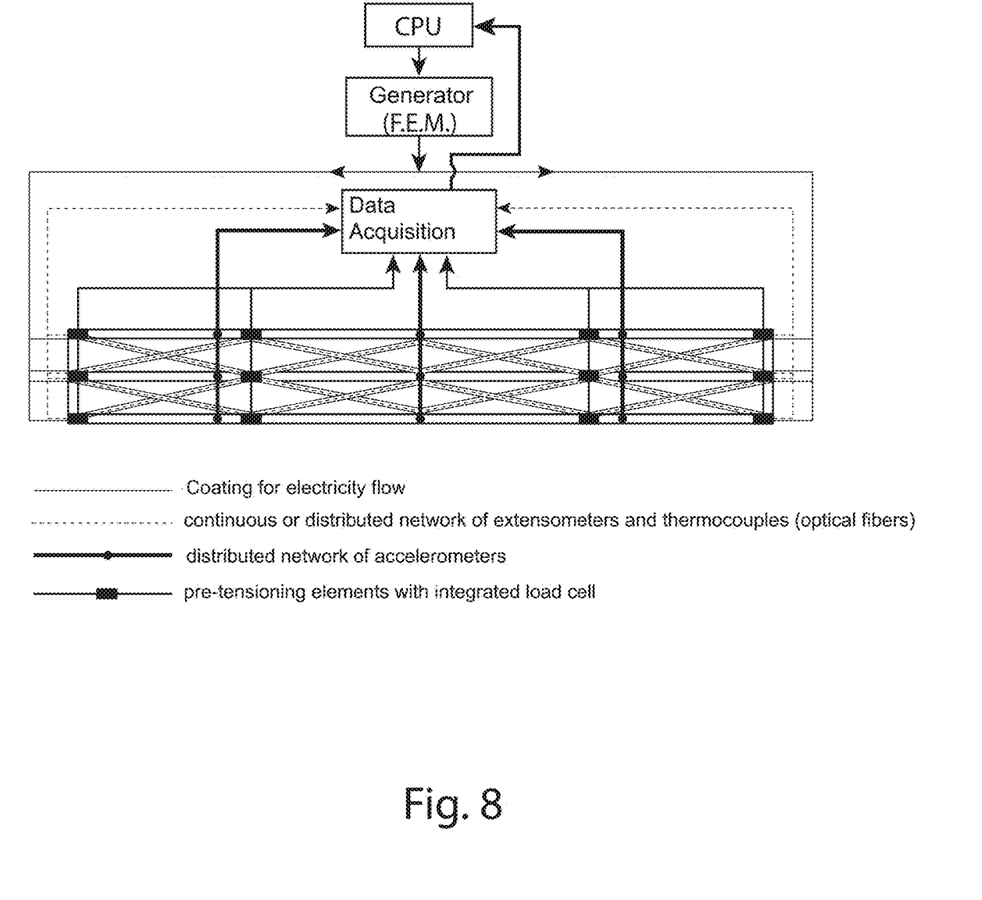
FIG. 8 shows a system for the active control of the tensairity, according to the present invention.

The control system destined to make the tensairity active is schematically represented in FIG. 8. The SMA or mixed SMA-other material ropes are equipped with a distributed network of sensors for the continuous or real-time measurement of temperature and strain level. In the case of distributed network, one can have strain gauges and thermocouples while in the case of continuous network optical fibers can be used.

In the area of anchorage between the ropes and the beams, elements with high slenderness are positioned, which are adapted to provide an additional pretensioning compared to that obtained with the pneumatic inflation element. Within these elements, load cells are embedded which are capable of measuring the tension level present in the ropes. The ropes are connected to an electromotive force generator which allows the passage of electric current. They are also wrapped in a coating that insulates them from the rest of the structure. Another possibility is to equip the coating, in addition to insulating material, also of high electrical conductivity material and to make the electric current flow in the latter. Finally, the high slenderness beams are equipped with a distributed network of accelerometers.

The network of sensors of extension, temperature, acceleration and the load cells send their measurements to an acquisition control unit which in turn sends this information to the central processing unit termed CPU. The CPU processes the information in real time using specific algorithms that combine mechanical simulations, identification processes and control cycles and adjusts, through the generator of the electromotive force, the current intensity inside the ropes.

Types of SMA and Mixed Ropes

The ropes used for tensairity structures can be realized in different formations that differ according to the number of strands, the number of wires constituting each strand, the relative position of the steel/SMA wires, and the winding angles of the strands and wires in the single strand. The usable shape-memory alloys are different: nickel-based (NiTi—nickel and titanium; NiAl—nickel and aluminum), based on copper (CuSn—copper and tin; CuMn—copper and manganese; CuAlNi—copper, aluminum and nickel; CuAlZn—copper, aluminum and zinc), iron based (FeTi—iron and titanium; FePt—iron and potassium; FeMnSi—iron, manganese and silicon).

Figure 9:
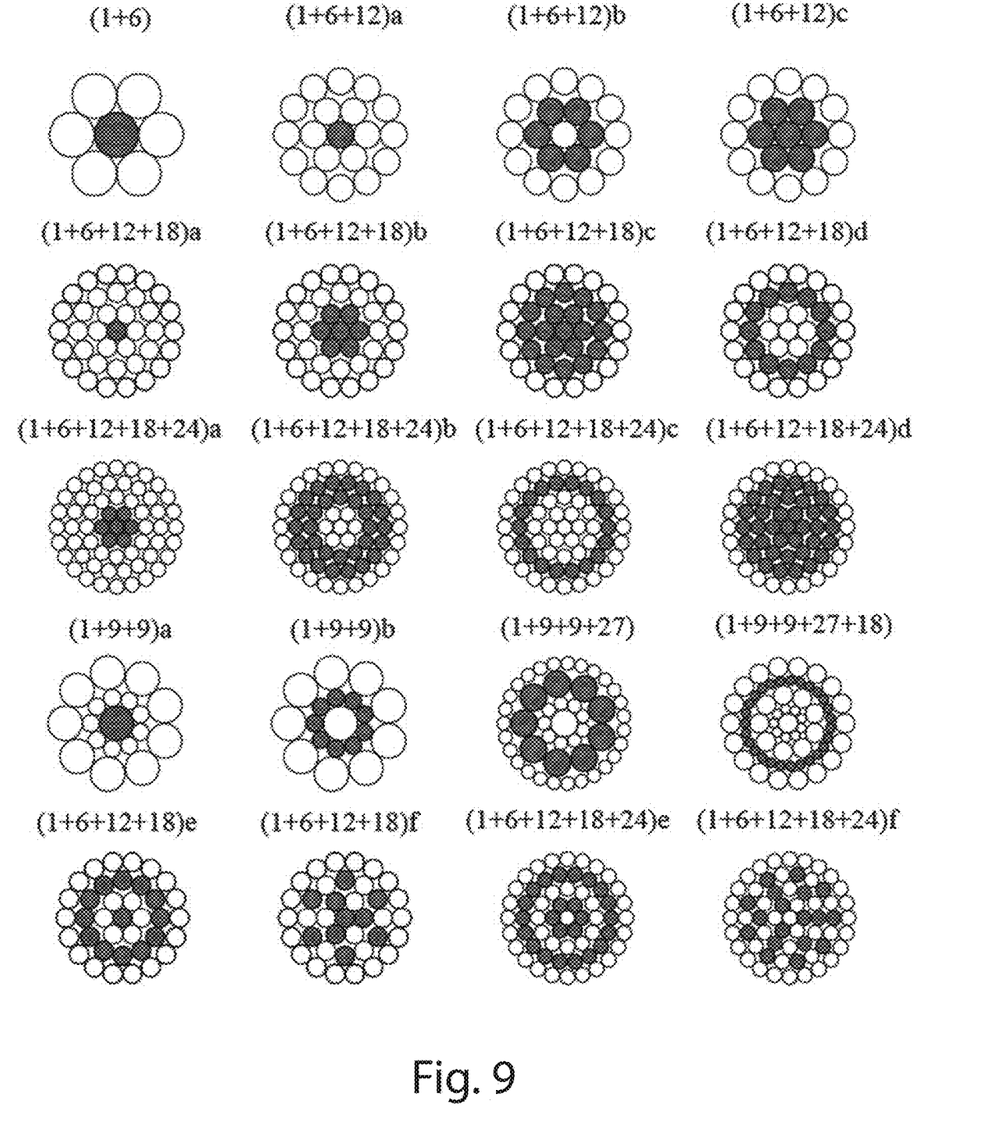
FIG. 9 shows cross-sections of mixed shape-memory ropes alloy-other single stranded material, in which the wires in dark gray are in the form of a shape-memory alloy and the remaining ones are made of another material, according to the present invention.
Figure 10:
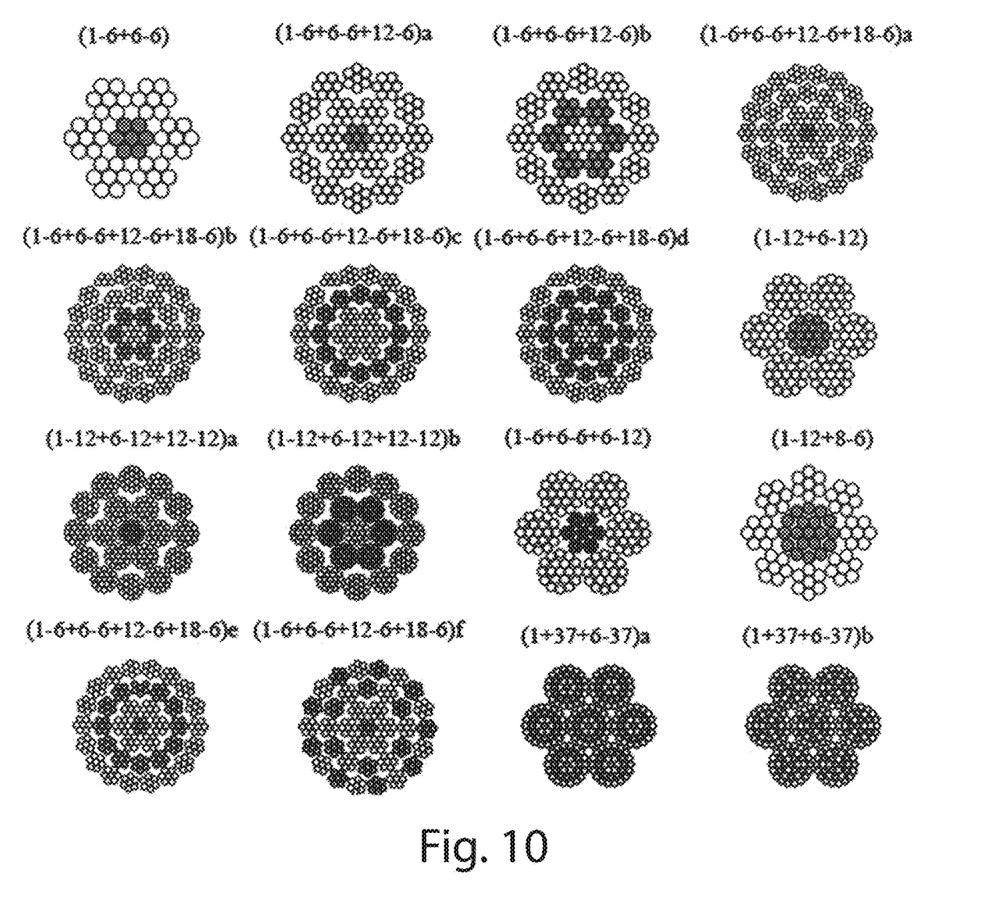
FIG. 10 shows cross-sections of cables mixed with shape-memory alloys and another, multiple strand material in which the wires in dark gray are in the shape memory alloys and the remainder in another material, according to the present invention.

In FIGS. 9 and 10 some cross sections of single strand and multiple strand cables are respectively given. The position of the steel wires or other material and of wires made of shape memory alloy is optimized depending on the application being considered to produce the desired mechanical behavior. "Other material" includes metallic or polymeric materials. The open spiral strands are named according to the number of wires that make up the various layers starting from the center towards the outside. For the multi-strand ropes, the number of strands of each layer and the number of wires constituting the single strand are indicated. The SMA wires are in dark gray whilst the remaining ones are in other material. The SMA wires are placed (a) in the central core of the rope, (b) in the outer layers, (c) arranged alternately with other material wires. For constructional reasons, the last layer always consists of steel and/or other material, for example polymer. The alternating arrangement between wires of different material and/or the SMA is formed both between the layers composing the spiral rope and within the same layer. The alternately placed strands ropes adopt the same criterion of the wires in the spiral alternated ropes and are also made in configurations that use, as a single strand, the alternating ropes of spiral type.

Figure 11:
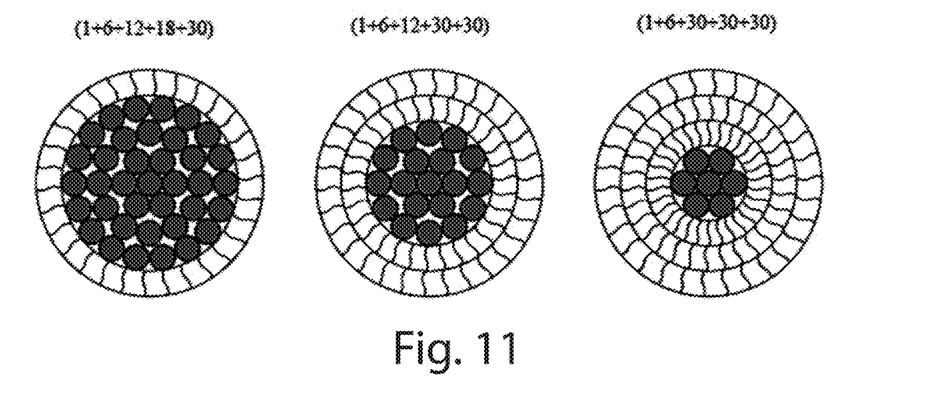
FIG. 11 shows cross sections of closed type in which the cylindrical wire ropes represented in dark gray are made of shape memory alloys while the remaining shaped wires, which carry the closure are in another material, according to the present invention.

The cables shown in FIGS. 9 and 10 may be of a various windings spiral type, beam (parallel wires) type and polygonal (braided strands) type. In FIG. 11, three possible sections of a closed rope (usually utilized in stays) are shown, in which the central cores are made of shape memory materials.

The ropes of FIGS. 9 and 10, in the case where it is necessary, can also be realized entirely in a shape-memory alloy by virtue of the high performance that may be required by a specific application of the tensairity.

Figure 12:
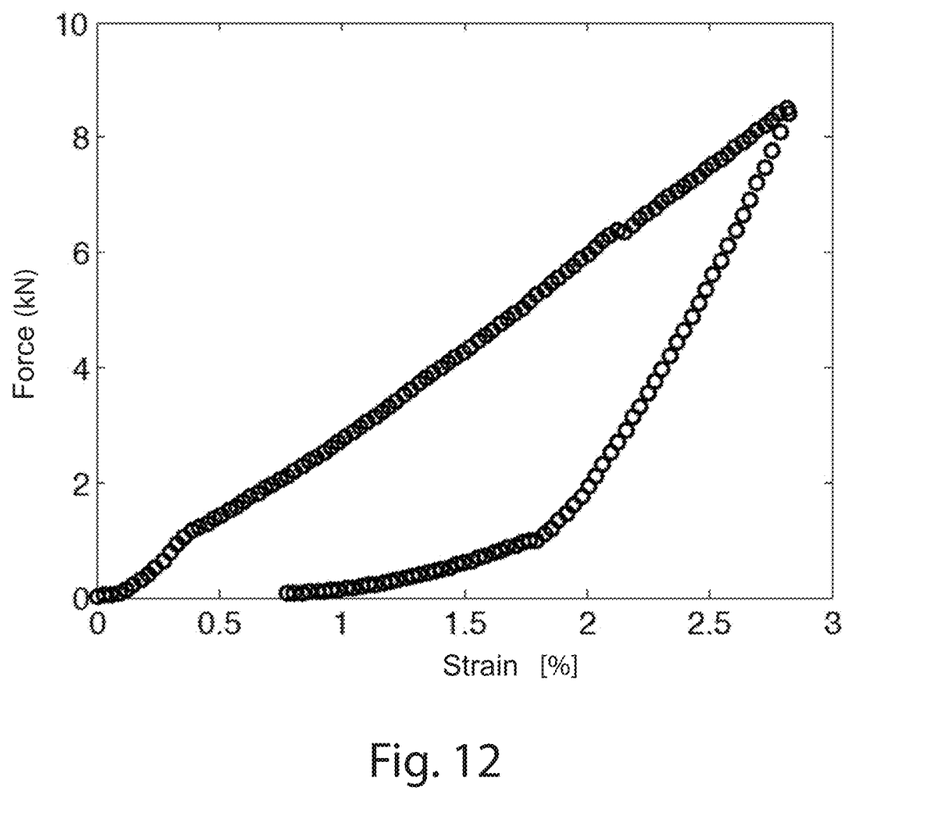
FIG. 12 shows a cyclic tensile test for the rope of diameter equal to 5.7 mm for which there is a high hysteretic dissipation.

A mixed one between the ropes of spiral type was made by the inventors in two different diameters. The first rope of 5.7 mm total diameter is made of stainless steel of the "AISI 302" type and shape memory alloy of nickel and titanium (Nitinol) with austenitic initial transition temperature=$-10°$ C. characterized by pseudoelastic behaviour at room temperature. The second rope of 19.5 mm total diameter is made with the same shape-memory alloy but with stainless steel of the "AISI 304" type. The cross section of both ropes is represented in FIG. 9 (see (1+6+12+18+24)b). It consists of 61 wires arranged in a central core and 4 subsequent layers (1+6+12+18+24) wound in the opposite direction. The layers containing 12 and 18 threads are made of NiTiNOL while the remaining ones are made of steel. This layout is optimized for a specific application that requires the SMA phase transition for bending stresses applied to the cable. FIG. 12 shows a tensile test performed with a MTS machine in the laboratory of materials and structures of the Department of Structural and Geotechnical Engineering, University of Rome La Sapienza. The experimental response curve shows a formidable hysteretic dissipation capacity. The residual deformation is due to the presence of friction and not to inelastic deformation in the material.

With regard to the choice of the type of shape memory alloys in the construction of the cables, it is necessary to distinguish between ropes used in tensairity as actuators (in which it is important to activate the effect of memory at temperatures compatible with the operating environment) and the ropes used to increase the inherent damping of the structure and change the tangent stiffness (in which the super-elastic or pseudoelastic effect) is used. For the first group, it is preferable the use of Nitinol alloys (nickel-titanium), while for the second group the use of binary alloys of Copper-Aluminium type or ternary Copper-Aluminium-Zinc type is preferred which offer the advantage of lower costs as they consist of less expensive metals of nickel and titanium. However, such a criterion is not general because the choice of the shape memory alloy to be used for the SE and ME effects depends on the type of application of tensairity (depending on which the economic aspect is established) and especially by the performance level which one wishes to reach for the specific functionalities.

The stranding process of mixed ropes requires ad hoc thermal processes with respect to standard methods for wire ropes due to the pseudo-elasticity of NiTiNOL whose wires tend to recover their original shape, not so preserving the winding impressed by the stranding process. To get ropes that preserve the shape performing a double heat process is needed. Moreover, the outmost layer made of another material has, as its main purpose, to enclose the shape memory material, thus promoting the compactness and the radial resistance of the rope. The mixed rope in another material and shape-memory alloy has, in addition, the advantage of greatly reducing production costs by virtue of the lower use of shape memory alloy and to facilitate the production process compared to that of ropes that consist entirely of wires in the shape-memory alloy.

Benefits

The proposed tensairity allows to extend the application of these structures to areas characterized by the presence of multidirectional dynamic actions. This is possible thanks to the additional damping induced by the presence of the shape-memory wire ropes. The latter make the tensairity adaptive according to the operating conditions. It is in fact possible to vary the tangent stiffness and geometric stiffness by modifying, by the Joule effect, the temperature of the SMA respectively superelastic- or shape-memory behaviour ropes. The control system is composed by a processor connected to a sensor network that monitors tension and temperature in the ropes and oscillations in tensairity. The system, based on the information processed by the processor, is able to adjust the flow of electrical current in the ropes, thus the temperature, and consequently the tension.

The main application areas are the stratospheric/space structures and roofings for large areas.

BIBLIOGRAPHY

[1] Luchsinger, R H, Pedretti, A., Steingruber, P., & Pedretti, M. (2004). The new structural concept Tensairity: Basic principles. Progress in structural engineering, mechanics and computation, 323-328.

[2] Luchsinger, R H, Pedretti, M., & Reinhard, A. (2004). Pressure induced stability: from pneumatic structures to Tensairity (R). Journal of Bionics Engineering, 1 (3), 141-148.

[3] William L. Heyniger, Garret Corp, U.S. Pat. No. 2,936,056 A, Variable length inflatable escape chute 1957.

[4] Bradley Sallee, Tracor Aerospace, Inc., U.S. Pat. No. 5,311,706 A, Inflatable truss frame, 1991.

[5] Bradley Sallee, Tracor Aerospace, Inc., U.S. Pat. No. 5,579,609 A, Rigidizable inflatable strucuture, 1994.

[6] Gary L, Bailey, Ross S. Woods, Obi Corporation, U.S. Pat. No. 6,463,699 B1, Air beam construction using differential pressure chambers, 2001.

[7] Mauro Pedretti, US 20060260209 A1, Flexible compression member for a flexible pneumatic structural element and pneumatic element means for erecting structures, 2004.

[8] Jean-Marc Daniel TurcotUS 20080295417 A1, Inflatable beam and truss structure, 2008.

[9] Mauro Pedretti, US 20110209416 A1, Pneumatic node for compression elements, 2011.
[10] Saul Griffith, Peter S. Lynn, Other Lab, Llc U.S. Pat. No. 8,640,386 B1, stiffening of an air beam, 2012.
[11] Suzuki, Y., K. Otsuka, and C M Wayman. "Shape memory materials" (1998): 137-138.
[12] Otsuka, K., and C M Wayman. "Mechanism of shape memory effect and superelasticity" Shape memory materials (1998): 27-49.

In the foregoing, preferred embodiments and variants of the present invention have been suggested, but it is to be understood that those skilled in the art can make modifications and changes, without so departing from the related scope of protection, as defined by the claims have been described attached.

What is claimed is:

1. A tensairity structure (200, 300), comprising a pneumatic element (220, 320) which extends along at least a director curve, one or more ropes (210, 310) connected to the ends of at least one high-slenderness beam rod (230, 330) in connection zones between the ropes, said at least one high-slenderness beam rod (230, 330) being anchored to said pneumatic element (220, 320) along said at least one director curve, the tensairity structure;
wherein
the at least one high-slenderness beam rod comprises four or more rods (230, 330), which are placed along as many director curves of said pneumatic element (220, 330);
wherein the tensairity structure comprises
four or more pairs of ropes (210, 310), which are made of at least one of a plurality of SMA wires and a combination of a plurality of threads made of a non-SMA material,
tensioning regulator for regulating the tension of said four or more pairs of ropes (210, 310) are included;
wherein said tensioning regulator comprise or are constituted by mechanical tensioners for adjusting the initial tension of said four or more pairs of ropes (210, 310), placed in said connection zones between the ropes and rods;
wherein said initial tensions include tensions in a linear regime of the SMA wires and tensions in a system of non-linear SMA wires.

2. The tensairity structure according to claim 1, wherein said tensioning regulator comprise a source of electrical current electrically connected to said four or more pairs of ropes such that the electric current induces a temperature change in at least one of said four or more pairs of ropes.

3. The tensairity structure according to claim 1, wherein the elastic modulus of said SMA wires is varied using a source of electrical current electrically connected to said four or more pairs of ropes such that the electric current induces a temperature variation in at least one of said four or more pairs of ropes.

4. The tensairity structure according to claim 2, wherein it comprises a control unit comprising a series of load, strain and temperature sensors applied at corresponding points of said four or more pairs of ropes, as well as an electronic logic unit configured to adjust the flow of current from said current source to said four or more pairs of ropes on the basis of detections of said series of load, strain and temperature sensors.

5. The tensairity structure according to claim 1, wherein said non-SMA material is steel.

6. The tensairity structure according to claim 1, wherein said SMA is NitiNOL or NiTiCu.

7. The tensairity structure according to claim 1, wherein on said four or more rods (230, 330) a series of accelerometers, preferably micrometric (MEMS), are applied.

8. The tensairity structure according to claim 1, wherein said four or more rods are made of a member of a group consisting of a metal alloy and a composite laminate material.

9. The tensairity structure according to claim 1, wherein said pneumatic element is made of PVC or any other waterproof textile composite material.

10. The tensairity structure according to claim 1, wherein said pneumatic element is of cylindrical shape.

11. The tensairity structure according to claim 1, wherein said pneumatic element is of toroidal shape.

12. The tensairity structure according to claim 8, wherein the metal alloy comprises aluminium.

13. The tensairity structure according to claim 8, wherein the composite laminate material comprises carbon fibers.

* * * * *